Aug. 4, 1959
R. J. KARR
2,898,200
AUTOMATIC TITRATOR CIRCUIT
Filed June 28, 1955
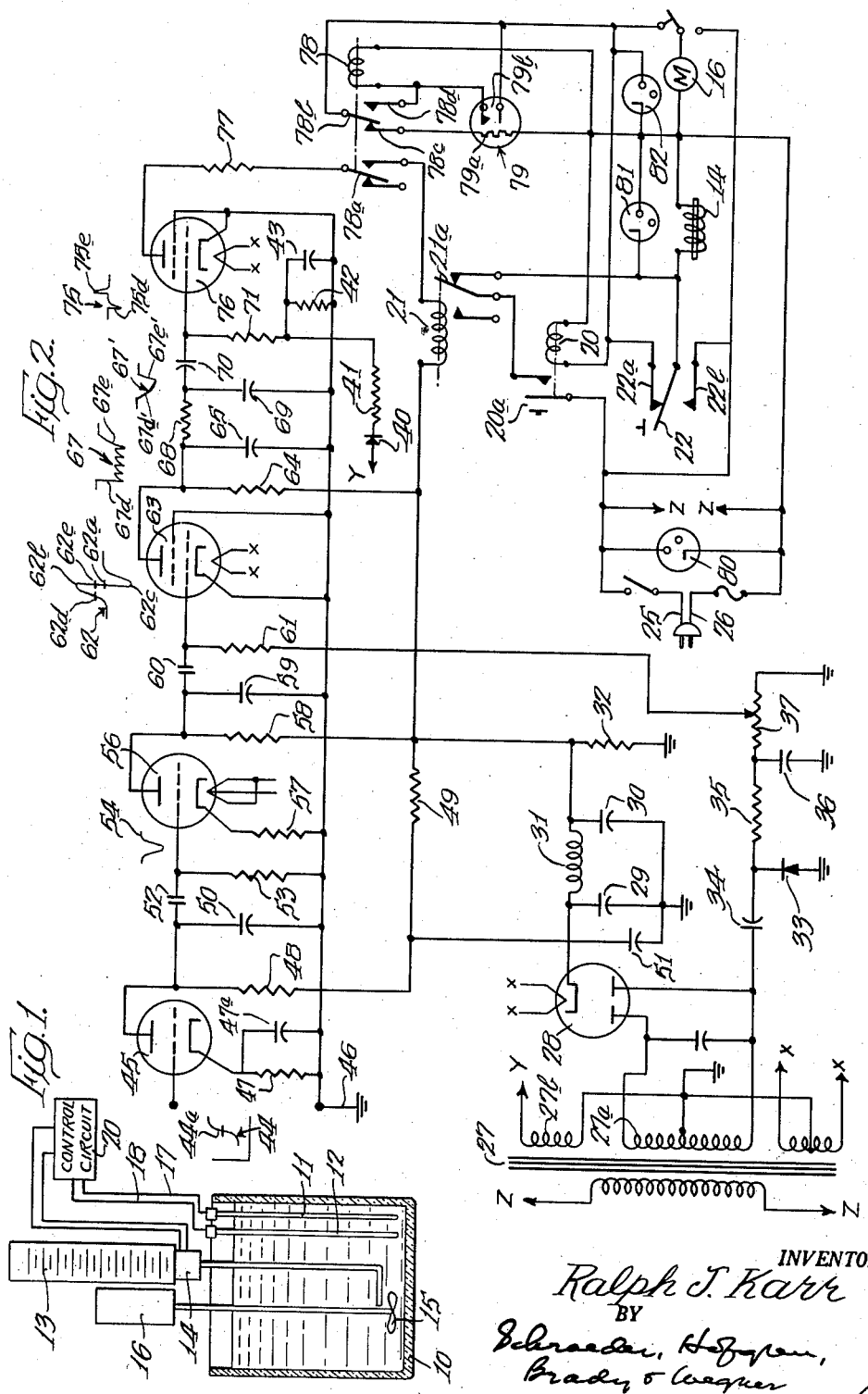
INVENTOR.
Ralph J. Karr
BY
Schraeder, Hofgren,
Brady & Wegner
Attys.

United States Patent Office 2,898,200
Patented Aug. 4, 1959

2,898,200

AUTOMATIC TITRATOR CIRCUIT

Ralph J. Karr, Chicago, Ill., assignor to E. H. Sargent & Co., a corporation of Illinois Application June 28, 1955, Serial No 518,598

12 Claims. (Cl. 23—253)

This invention is concerned with the titration of solutions and more particulraly with a system for automatically determining the equivalence or end point of a titration.

The process of titration is used quite widely in conducting quantitative analyses to determine the strength or concentration of a solution. The process is conducted by reacting with a known quantity of a solution of unknown strength, a solution of known strength and determining the point at which the reaction is complete. The quantity of the added solution may then be utilized to calculate the strength of the unknown solution. If a pair of suitable electrodes are placed in the solution being titrated a voltage is generated between the electrodes which, when plotted as a function of the amount of titrant added, gives a generally S-shaped curve, known as the potentiometric curve for the titration. It has been found that the inflection point of the potentiometric curve corresponds with the equivalence or end point of the titration.

The general object of the present invention is to provide a novel system responsive to the potentiometric curve of the titration for controlling the titration and for indicating the end point thereof.

Another object is to provide, in an apparatus for titrating a solution, means, including electrodes in the solution, for producing a signal which is a function of the potentiometric curve, an oscillator having a control element to which the signal is connected for causing oscillations during a portion of the curve, and means including a circuit triggered by the oscillations, for indicating the end point of the titration. A further object is to provide such a system in which oscillation is caused during a portion of the potentiometric curve and terminating substantially at the equivalence point of the titration, providing a square wave pulse of oscillations, means for differentiating the square wave pulse, providing a sharp positive pulse at the end thereof, and a grid-controlled gas tube having a control element to which the differentiated pulse is applied, the positive pulse causing the tube to conduct, and means in the anode circuit of the gas tube for indicating the end point of the titration when the tube conducts.

Another object is to provide apparatus for controlling the titration of a solution, comprising electrically operated means for adding titrant to the solution, a circuit for energizing the means and including a normally closed switch and starting means, electrically operated means for opening the normally closed switch at the end point of the titration, a circuit for energizing the switch opening means and including means preventing such energization, and means initiated by the starting means for permitting energization of the switch opening means and means for energizing the switch opening means at the end point of the titration. A further object is to provide such apparatus in which the means for permitting the energization of the switch opening means includes a thermal time delay relay and an operating circuit therefor which is broken on operation of the time delay relay, permitting the relay to cool.

Another object is to provide apparatus for controlling the titration of a solution comprising electrically operated means for controlling the addition of a titrant to the solution, means for deriving from the solution an electrical signal which is a derivative function of the potentiometric curve for the titration, a circuit for energizing the titrant controlling means, including a normally closed switch and means for starting the addition of titrant, means for opening the normally closed switch and having an operating circuit with a normally open switch therein, a relay for closing the normally open switch, a circuit for energizing said relay and including a time delay relay, the operation of which is initiated by the starting means, and means, including a grid-controlled gas tube, triggered by the signal for energizing the operating circuit for opening the normally closed switch at the end point of the titration.

The objects of the invention generally set forth, together with other ancillary advantages, are attained by the construction and arrangement shown by way of illustration in the accompanying drawings, in which:

Figure 1 is a diagrammatic sketch of a titration set up utilizing the present invention; and Figure 2 is a schematic diagram of the titration control circuit.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

Turning now to Figure 1 of the drawings, a beaker 10 is shown into which is placed a known quantity of a solution of unknown strength. Also positioned within the beaker are a pair of electrodes 11 and 12 across which a varying voltage, corresponding to the potentiometric curve of the titration, is developed during the titration process. The titrant, a solution of known strength, is added to the beaker 10, preferably at a constant rate, from a graduated buret 13 through an electrically controlled device, as valve 14. The reaction between the two solutions is speeded by constantly stirring the contents of the beaker, as by a small paddle wheel 15 driven by motor 16. The voltage developed across electrodes 11 and 12 is coupled through leads 17 and 18 to an electrical control circuit 20 (indicated in block form) which effects the desired control of the operation of valve 14. The electrical signal derived from the electrodes is utilized, as will appear, to close valve 14, stopping the flow of titrant at substantially the equivalence point of the titration. The quantity of titrant used may then be noted from the buret graduations.

Turning now to Figure 2, the electrical control circuit will be described. While one specific circuit is shown herein and values will be given for the components thereof, it is to be understood that the circuit is intended to be representative only and the details thereof, such as component values and tube types, are not critical, unless specifically stated to the contrary.

The control circuit is energized from a source of power, as 110 volts, 60 cycle alternating current to which power leads 25 and 26 are connected. The primary winding of power supply transformer 27 is connected across the line and the transformer has a high voltage secondary winding 27a to which are connected the plates of a full wave rectifier 28, a 6X4. The rectified voltage appearing at cathode 28 is filtered by a network including capacitor 29, 10 µf. (microfarad), capacitor 30, 40 µf. and inductor 31, 15 henries. The power supply also includes a selenium rectifier 33 which is connected through capacitor 34, .02 µf., to one terminal of the high voltage secondary 27a. The rectified voltage from rectifier 33 is filtered by a network comprising resistor 35, 390,000 ohms, and capacitor 36, 100 µf., and a filtered negative bias voltage appears across potentiometer resistor 37, 100,000 ohms. A second bias voltage supply includes a rectifier 40, a 1N34, connected to secondary winding 27b of the power transformer and a filter network comprising current limiting resistor 41, 270 ohms, resistor 42, 100,000 ohms and capacitor 43, 40 µf.

The addition of titrant to the solution is initiated by manually closing switch 20a completing a circuit through normally closed contacts 21a associated with relay 21 energizing electrically operated titrant valve 14. A circuit is also completed through contact 22a of double-throw switch 22 energizing relay coil 20, holding switch 20a in closed position.

The voltage developed across electrodes 11 and 12 has, when plotted as a function of the quantity of titrant added (or as a function of time, where titrant is added at a constant rate) a generally S shape as shown at 44 and is connected to the control grid of amplifier 45, one-half of a 12AX7 dual triode. The inflection point 44a of the curve corresponds with the equivalence point for the titration. The cathode of amplifier 45 is returned to ground 46 through resistor 47, 9,000 ohms, by-passed by capacitor 47a, 3,000 µf., providing self-bias for the stage. Capacitor 47a must be of a large size to keep the cathode voltage stable, as the signal has a frequency of about ⅙ c.p.s. The plate of amplifier 45 is connected through load resistor 48, 510,000 ohms, and decoupling resistor 49, to the B+ power supply. Capacitor 50, .02 µf., is connected between the plate and ground effectively by-passing high frequency noise and other spurious signals. Capacitor 51, 40 µf., is connected across resistor 49 to ground and serves to keep alternating components of the plate current out of the power supply.

The amplified signal representing the potentiometric curve is differentiated by the resistance-capacitance circuit including capacitor 52, .5 µf., and resistor 53, 1 megohm. The signal 54, which represents the first derivative of the potentiometric curve, appears across resistor 53 and is connected to the control grid of amplifier 56, the other half of the 12AX7. The cathode of amplifier 56 is returned through bias resistor 57, 3,300 ohms, to ground while the plate is connected through load resistor 58, 560,000 ohms, to the B+ power supply. Spurious high frequency signals are by-passed by capacitor 59, .02 µf., and the amplified first derivative signal is differentiated by a circuit including capacitor 60, .5 µf. and resistor 61, 1 megohm.

The voltage appearing across resistor 61, the second derivative of the potentiometric curve for the titration, is coupled to the control grid of a gas-filled tube 63, a 2D21. The second derivative signal has a characteristic shape as shown by curve 62 in which there occurs first a positive pulse 62b followed by a negative pulse 62c. The point 62a at which the signal passes through zero, midway between positive peak 62b and negative peak 62c, corresponds with inflection point 44a of the potentiometric curve 44, the equivalence point for the titration.

Resistor 61 is returned to a variable negative voltage obtained from potentiometer 37 so that a negative bias voltage is applied to the control grid of gas tube 63, maintaining it in a non-conducting condition during the initial portion of the titration. The anode of gas tube 63 is connected to the B+ power supply through resistor 64, 560,000 ohms; and capacitor 65, .05 µf., is connected from the plate to ground. As the voltage appearing at the control grid of gas tube 63 goes positive the tube will fire at a point 62d, the exact position of which depends on the setting of potentiometer 37. When the gas tube fires, capacitor 65 discharges rapidly through the tube dropping the plate voltage almost to zero, causing the tube to cease conducting. Capacitor 65 will then begin to charge again through resistor 64; and as soon as the voltage at the plate of gas tube 63 reaches a high enough level, as 25 volts, the tube will fire again discharging capacitor 65. This oscillation will continue so long as the voltage on the control grid of tube 63 is sufficiently positive to cause the tube to fire when there is a substantial positive voltage on the plate. However the oscillation will cease after the signal applied to the grid passes point 62e of curve 62 and the grid again becomes negative.

Curve 67 represents the signal appearing at the plate of oscillator 63 and may be described as a square wave pulse of high frequency oscillations and having a leading edge 67d corresponding with point 62d of curve 62 and a trailing edge 67e corresponding with the point 62e (and thus corresponding substantially with point 62a, the equivalence point of the titration). The high frequency oscillation components of the square wave signal are removed by a filter including resistor 68, 1 megohm, and capacitor 69, 1 µf., the square wave 67' alone, having a leading edge 67d' and a trailing edge 67e', appearing across capacitor 69.

Square wave 67' is differentiated by a network including capacitor 70, .05 µf. and resistor 71, .75 megohm. The differentiated square wave is represented by curve 75, and has first a negative pulse 75d followed by a positive pulse 75e, corresponding to the leading and the trailing edges of the square wave, respectively.

Signal 75 is applied to the control grid of a second gas tube 76, also a 2D21. Grid resistor 71 is returned to resistor 42, applying a negative voltage to the control grid of gas tube 76 preventing it from conducting during the initial portion of the titration operation.

The anode circuit of gas tube 76 includes a current limiting resistor 77, 10,000 ohms, normally open contacts 78a associated with relay 78 and the operating coil of relay 21. For the time being, it will be assumed that contacts 78a are closed. The negative pulse 75d applied to the control grid of gas tube 76 has no effect on its condition as the grid is already negative due to the bias applied thereto. However, when positive pulse 75e occurs, gas tube 76 immediately conducts and relay 21 is energized opening normally closed contacts 21a associated therein. This in turn breaks the energization circuit for titrant valve 14 permitting the valve to close and stopping the addition of titrant. It will be recalled that the leading edge of positive pulse 75e corresponds with the trailing edge 67e of the square wave appearing at the plate of gas tube oscillator 63 and with the inflection point 44a of the potentiometric titration curve. Thus, the addition of titrant is terminated at the end point of the titration. The quantity of titrant which has been added to the solution may be ntoed from the buret graduations and the necessary calculations performed to determine the strength of the unknown solution.

The fact that the positive pulse 75e may occur slightly in advance of the actual equivalence point for the titration (point 62e of curve 62 is slightly in advance of point 62a) is at least partially compensated for by the mechanical lag in the operation of relay 21 and in the closing of valve 14 and any error introduced is well within usual experimental limits. The difference between points 62e and 62a of curve 62 may be controlled to a certain extent by varying the amplitude of the negative bias voltage applied to the grid of tube 63. This voltage must, however, be sufficient to prevent triggering of tube 63 by continuous positive noise pulses.

The filter or integrator circuit composed of resistor 68 and capacitor 69 serves as a pulse width discriminator circuit in addition to filtering the oscillator frequencies from the square wave 67. The R-C time constant of this circuit is relatively long, in the embodiment shown, one second, so that capacitor 69 discharges slowly as indicated by the shape of the leading edge 67d' of the signal appearing across the capacitor. It has been found in practice that the square wave 67 occurring during the positive swing of the second derivative of the potentiometric curve has a duration of about three seconds, and with a one second time constant capacitor 69 is substantially completely discharged before the end of the oscillations. As a result, the positive pulse 75e of the differentiated square wave will have a maximum amplitude. In general, positive noise pulses sufficient in amplitude to trigger tube 63 have a duration much less than that of the positive swing of the second derivative of the potentiometric signal. Accordingly, when tube 63 is triggered by noise, the resulting square wave is also of shorter duration (although of the same amplitude) and capacitor 69 is not completely discharged. The positive pulse of the differentiated square wave resulting from noise is of a lesser amplitude, insufficient to trigger control tube 76. With the circuit components described, the negative bias applied to the control tube 76 is adequate to prevent it being triggered by positive noise pulses having a duration of less than one and a half seconds.

At the start of a titration operation, the signal developed across electrodes 11 and 12 includes a substantial amount of noise due to stirring and certain electro-chemical phenomena. In order to prevent accidental triggering of gas control tube 76 as a result of these noise voltages, normally open switch contacts 78a are provided in the anode circuit. A thermal time delay relay 79 has its heater element 79a connected in parallel with relay 20 and is energized on initiation of the titration operation. After a suitable period, as ten seconds, contacts 79b associated with the time delay relay close completing a first energization circuit for relay 78, closing contacts 78a, and completing the anode circuit of control tube 76. Also associated with relay 78 are a second set of contacts including double-throw switch arm 78b and contacts 78c and 78d. Contact 78c is normally closed and is in the energization circuit for heater element 79a of the time delay relay. When relay 78 is energized, contact 78c opens and contact 78d closes completing a secondary energization circuit for relay 78 and maintaining relay 78 energized until the end of the titration. In the meantime, thermal time delay relay 79 is permitted to cool, readying it for a subsequent titration operation.

Double-throw switch 22 may be manually operated to close contact 22b to energize titrant valve 14 in order to level or to drain buret 13 as desired. Neon glow tubes 80, 81 and 82 indicate the energization, respectively, of the titration apparatus, titrant valve 14, and stirrer motor 16.

I claim:

1. Apparatus for titrating a solution, comprising: means, including electrodes in said solution, for producing a signal which is a function of the potentiometric curve for the titration; an oscillator having a control element to which said signal is connected for causing oscillation during a portion of said curve and terminating substantially at the equivalence piont of said titration, providing a square wave pulse of oscillations; means for differentiating said square wave pulse, providing a sharp positive pulse at the end thereof; a grid controlled gas tube having a control element to which said differentiated pulse is applied; and means in the anode circuit of said gas tube for indicating the end point of said titration when the tube conducts.

2. Apparatus for titrating a solution, comprising: means, including electrodes in said solution, for producing a signal which is a function of the second derivative of said potentiometric curve; a grid controlled gas tube to which said signal is applied; a resistance-capacitance circuit connected to the anode of said gas tube for producing a pulse of oscillations during the positive swing of said signal and terminating substantially at the end point of said titration; and means connected with said resistance-capacitance circuit, triggered at the end point of said pulse of oscillations for indicating the end point of the titration.

3. In an apparatus for titrating a solution: means, including electrodes in said solution, for producing a signal which is a function of the potentiometric curve for the titration; an oscillator having a control element to which said signal is connected for causing oscillations during a portion of said curve; and means, including a circuit triggered by said oscillations, for indicating the end point of the titration.

4. Apparatus for titrating a solution, comprising: means, including electrodes in said solution, for producing a signal which is a function of the potentiometric curve for the titration; an oscillator having a control element to which said signal is connected for causing oscillation during a portion of said curve and terminating substantially at the end point of said titration; and means connected with said oscillator, including a circuit triggered on the cessation of said oscillations, for indicating the end point of the titration.

5. Apparatus for titrating a solution, comprising: means, including electrodes in said solution, for producing a signal which is a function of the potentiometric curve for the titration; an oscillator having a control element to which said signal is connected for causing oscillation during a portion of said curve and terminating substantially at the end point of said titration, providing a square wave pulse of oscillations; a circuit for differentiating said pulse; and means, including a circuit triggered by the differentiated pulse, for indicating the end point of the titration.

6. A control circuit for an automatic titrating apparatus having electrical operating means for controlling the flow of titrant to a solution, comprising: a circuit for energizing said means and including a normally closed switch and starting means; electrically operated means for opening said normally closed switch at the end point of the titration of the solution by the titrant; a circuit for energizing said switch opening means and including means preventing such energization; and time delay means initiated by said starting means for permitting energization of said switch opening means.

7. A control circuit for an automatic titrating apparatus having electrical operating means for controlling the flow of titrant to a solution, comprising: a circuit for energizing said titrant controlling means, including a normally closed switch and means for starting the addition of titrant; means for opening said normally closed switch and having an operating circuit with a normally open switch therein; a relay for closing said normally open switch; a circuit for energizing said relay and including a time delay relay, the operation of which is initiated by said starting means; and means for energizing the operating circuit for opening said normally closed switch, at the end point of said titration.

8. A control circuit for an automatic titrating apparatus having electrical operating means for controlling the flow of titrant to a solution, comprising: a circuit for energizing said titrant controlling means, including a normally closed switch and means for starting the addition of titrant; means for opening said normally closed switch and having an operating circuit with a normally open switch therein; means for closing said normally open switch and including time delay means, the operation of which is initiated by said starting means; and means for energizing said operating circuit opening said normally closed switch, at the end point of said titration.

9. A control circuit for an automatic titrating apparatus having electrical operating means for controlling the flow of titrant to a solution, comprising: a circuit for energizing said titrant controlling means, including a normally closed switch and means for starting the addition of titrant; means for opening said normally closed switch and having an operating circuit with a normally open switch therein; a relay for closing said normally open switch; a circuit for energizing said relay and including a time delay relay, the operation of which is initiated by said starting means; and means, including a grid-controlled gas tube, for energizing the operating circuit for opening said normally closed switch at the end point of said titration.

10. A control circuit for an automatic titrating apparatus having electrical operating means for controlling the flow of titrant to a solution, comprising: a circuit for energizing said titrant controlling means, including a normally closed switch and means for starting the addition of titrant; means for opening said normally closed switch and having an operating circuit with a normally open switch therein; a relay for closing said normally open switch; a circuit for energizing said relay and including a thermal time delay relay, the operation of which is initiated by said starting means; a normally closed switch in the energization circuit of said time delay relay, said switch being opened on operation of said first mentioned relay; and means for energizing the operating circuit for opening said normally closed switch, at the end point of said titration.

11. Apparatus of the character described in claim 10, wherein the normally closed switch operated by said first mentioned relay is a double-throw switch, the contact thereof which closes when said relay is energized completing a secondary energization circuit for the relay.

12. Apparatus for titrating a solution, comprising: means, including electrodes in said solution, for producing a signal which is a function of the potentiometric curve for the titration; an oscillator having a control element to which said signal is connected for causing oscillation during a portion of said curve and terminating substantially at the equivalence point of said titration, providing a square wave pulse of oscillations; means for integrating said square wave; means for differentiating the integrated square wave pulse, providing a sharp positive pulse at the end thereof; a grid-controlled gas tube having a control element to which said differentiated pulse is applied; and means in the anode circuit of said gas tube for indicating the end point of said titration when the tube conducts.

References Cited in the file of this patent

UNITED STATES PATENTS

| | | |
|---|---|---|
| 2,666,691 | Robinson et al. | Jan. 19, 1954 |
| 2,726,936 | Bernheim | Dec. 13, 1955 |

FOREIGN PATENTS

| | | |
|---|---|---|
| 68,815 | Denmark | Mar. 28, 1949 |